(12) United States Patent
Mishkin

(10) Patent No.: US 11,661,261 B2
(45) Date of Patent: May 30, 2023

(54) SELF-CONTAINED MEAL ASSEMBLY WITH STEAM VENT

(71) Applicant: Mishkin Holdings LLC, Dania Beach, FL (US)

(72) Inventor: Saul Mishkin, Dania Beach, FL (US)

(73) Assignee: MISHKIN HOLDINGS LLC, Pembroke Park, FL (US)

( * ) Notice: Subject to any disclaimer, the term of this patent is extended or adjusted under 35 U.S.C. 154(b) by 516 days.

(21) Appl. No.: 15/188,053

(22) Filed: Jun. 21, 2016

(65) Prior Publication Data

US 2017/0283155 A1 Oct. 5, 2017

Related U.S. Application Data

(60) Provisional application No. 62/296,815, filed on Feb. 18, 2016.

(51) Int. Cl.
*B65D 81/34* (2006.01)
*A23L 5/10* (2016.01)

(52) U.S. Cl.
CPC .......... *B65D 81/3484* (2013.01); *A23L 5/13* (2016.08); *A23V 2002/00* (2013.01); *B65D 2205/02* (2013.01)

(58) Field of Classification Search
CPC .......... B65D 81/3484; B65D 2205/02; B65D 2205/00; A23L 5/13; A23V 2002/00
See application file for complete search history.

(56) References Cited

U.S. PATENT DOCUMENTS

| 2,620,788 | A | 12/1952 | Rivoche et al. |
| 3,094,981 | A | 6/1963 | Brewer |
| 3,287,140 | A | 11/1966 | Brussell |
| 3,970,068 | A | 7/1976 | Sato |
| D270,618 | S | 9/1983 | Shillman |
| 4,559,921 | A | 12/1985 | Benmussa |

(Continued)

FOREIGN PATENT DOCUMENTS

WO WO1997045336 12/1997

OTHER PUBLICATIONS

MRE Info (https://web.archive.org/web/20151201055128/https://www.mreinfo.com/mres/) (Year: 2015).*

(Continued)

*Primary Examiner* — Erik Kashnikow
*Assistant Examiner* — Lela S. Davis
(74) *Attorney, Agent, or Firm* — Malloy & Malloy PL

(57) ABSTRACT

A self-contained meal assembly comprises a heating bag, a food pouch, and a heating element. In operation, a heating element is placed along a bottom portion of a heating bag, a food pouch is placed inside proximate the heating element, a predetermined amount of water or other nonflammable aqueous liquid is added, and the heating bag is resealed thereby allowing an exothermic reaction to occur within the heating bag. One or more steam vents formed through a heating bag allow steam to discharge from the interior of the heating bag during operation. The configuration of the steam vent(s) allows a controlled release of high temperature steam from the heating bag as it circulates within the heating bag to the steam vent(s) at a safe discharge angle relative to the sides of the heating bag.

11 Claims, 5 Drawing Sheets

(56) References Cited

U.S. PATENT DOCUMENTS

| | | | |
|---|---|---|---|
| 5,220,909 A | 6/1993 | Pickard et al. | |
| 5,611,329 A | 3/1997 | Lamensdorf | |
| D452,819 S | 1/2002 | Berman | |
| 6,637,939 B2 | 10/2003 | Huffer | |
| 6,719,140 B1 * | 4/2004 | Rinsler | A45C 11/20 |
| | | | 206/541 |
| 6,947,664 B1 | 9/2005 | Yeh | |
| D573,404 S | 7/2008 | Wahl | |
| 7,744,940 B2 | 6/2010 | Hickey | |
| 3,001,959 A1 | 8/2011 | Ford et al. | |
| 8,434,637 B2 | 5/2013 | Mita et al. | |
| 8,443,793 B2 | 5/2013 | Payen et al. | |
| 8,555,870 B2 | 10/2013 | Coffey et al. | |
| 9,126,734 B2 | 9/2015 | von Glasow | |
| D817,773 S | 5/2018 | Kim et al. | |
| D847,000 S | 4/2019 | Arzano | |
| D881,019 S | 4/2020 | Recchia | |
| D910,461 S | 2/2021 | Mishkin | |
| 2005/0255200 A1 | 11/2005 | Takahagi et al. | |
| 2007/0031547 A1 | 2/2007 | Crist | |
| 2007/0134382 A1 | 6/2007 | Schmal et al. | |
| 2008/0230046 A1 * | 9/2008 | Richardson | F24V 30/00 |
| | | | 126/263.08 |
| 2014/0014088 A1 | 1/2014 | Young | |
| 2014/0314917 A1 | 10/2014 | Pollock | |
| 2015/0251838 A1 | 9/2015 | Huselton | |

OTHER PUBLICATIONS

Halford, The Science Of Feeding Soldiers (Year: 2010).*
Heater Meals (https://web.archive.org/web/20140306041318/https://store.shopreadyamerica.com/73605.html also see https://www.youtube.com/watch?v=itoGm_6tUpY). (Year: 2014).*
Heater Meals (https://web.archive.org/web/20130827131613/http://heatermeals.com/how-self-heating-works/) (Year: 2013).*

* cited by examiner

SELF-CONTAINED MEAL ASSEMBLY WITH STEAM VENT

BACKGROUND OF THE INVENTION

Field of the Invention

This invention is directed to a self-contained hot meal assembly including a heating bag having a steam vent and an exothermic efficient configuration. Specifically, the combination and configuration of the present invention provides for a heating bag having at least one steam vent that allows for optimal exposure of an internal food pouch to steam generated by a water-activated heating element, which altogether allows for effective storage, transit, heating, and disposal of a portable meal.

Description of the Related Art

A "Meal, Ready-to-Eat", more commonly known as a MRE, is a self-contained, individual field ration originally created by the United States military for its service members engaged in combat or other field operations, where food preparation facilities were not readily available. Being lightweight and self-contained, MREs allow for more food rations to be carried on extended trips. MREs have evolved and improved since their original conception years ago and today have been increasingly adapted for use by people while hiking, camping, or engaging in other outdoor activities, where it may be beneficial or perhaps even necessary to have portable and self-contained food rations.

One notable improvement in the history of MREs was the addition of a flameless ration heater (FRH) in 1990, which involved the use of a water-activated exothermic reaction product that emits heat. This product allowed a service member or a backpacker to enjoy a hot meal in the field or on the trek, by placing the food in proximity to the heating element.

As such, MREs provide significant advantages when compared to freeze dried food alternatives, which still require carrying a supply of potable water and a pot in which to heat the water using either a portable stove, which then must also be carried, or building a campfire onsite, which may not always be convenient or safe.

However, the current design of this heating element in combination with traditional MRE packaging is less than ideal, as the current solution requires the placement of a heating pack on one side of the MRE meal pouch, enclosed by an external paper-based carton. The result of this approach is an unevenly heated meal, and an inefficient exothermic reaction due to the inability of the external carton to preserve and circulate heat or steam. As such, in lower temperature environments, the heating packet and the external carton utilized are insufficient for evenly or properly heating up a meal to the desired temperatures. Therefore, there is a need in this area for an improved MRE or self-contained hot meal assembly, which allows for more efficient and controlled heating of a portable meal, and which also provides the convenience of a single self-contained, low-profile, environmental-friendly, and cost-effective packaging.

SUMMARY OF THE INVENTION

The present invention is generally directed to a self-contained hot meal assembly. As such, initially and in broad terms, a self-contained hot meal assembly of the present invention generally comprises a heating bag having a steam vent, a food pouch, a heating element, and, optionally, a utensil packet or bag, and/or combinations thereof. Each of the included elements may be prepackaged in a heating bag which may also serve as an external packaging for the self-contained hot meal assembly.

In operation, a heating element is placed within an interior of a heating bag at a bottom or lower portion thereof. A food pouch is placed within the heating bag either above the heating element, beside the heating element, or otherwise proximal to the heating element. A predetermined amount of water or any other nonflammable aqueous liquid is added to the heating bag, and the heating bag is quickly resealed. An aqueous activated exothermic reaction is created by exposing the heating element to the predetermined amount of water or other nonflammable aqueous liquid, which causes steam to rise and circulate around the food pouch. The steam is evacuated from the heating bag at a slow and controlled rate via a steam vent disposed on a distal and/or upper portion of the heating bag.

The heating bag may comprise a resealable opening to allow removal of various components from the heating bag, and to allow closure of the heating bag during operation, i.e., while heating a food pouch therein. The resealable opening may comprise one or more resealable strip(s) such as a press-and-seal zipper. At least one steam vent is formed along a portion of the heating bag, such as a distal and/or upper portion thereof, and/or at a distal and/or upper corner of the heating bag in order to facilitate the controlled and safe evacuation or release of the steam generated therein away from a user. As such, the steam vent may comprise a substantially circulator aperture imprinted or structured onto the heating bag during construction.

The heating bag may include a single or multilayer film composition designed to be flexible and lightweight, such as to include a base structured and dimensioned to allow the heating bag to stand in a substantially upright position and to provide stability when the product is in operation. An appropriate sealant may be used in its construction having a melting point greater than 120 degrees Celsius in order to accommodate for a high efficiency and highly reactive heating element. In at least one embodiment, a heating bag includes a multi-layer construction. In one further embodiment, a water line or visual indicator is printed onto the heating bag along a transparent or partially transparent portion thereof, so that a user can visually determine the predetermined amount of water or other nonflammable aqueous liquid to be added.

A food pouch in accordance with the present invention may similarly comprises a single or multi-layer foil pouch including food-safe materials as approved by the Food and Drug Administration, and is also designed to accommodate high temperatures greater than 120 degrees Celsius. A food pouch in at least one embodiment comprises a 4-ply layer foil pouch. A food pouch may undergo retort processing to allow for sterile packaging of food handled by aseptic processing. A retort process is conducted at high temperatures and/or at high pressure for complete sterilization and for extending the shelf life of the food stored in the food pouch.

A heating element may include any number of chemical composition(s) for generating heat in oxidation-reduction when exposed to water or any other nonflammable aqueous liquid. A heating element may comprise magnesium metal, and may further comprise a mixture of aluminum, calcium oxide, calcium carbonate, calcium di-hydroxide, sodium carbonate, and/or sodium hydroxide for catalyzing and/or accelerating the aqueous exothermic reaction. The heating element may be housed within a fabric pouch or container which, in at least one embodiment, is biodegradable. In one further embodiment, a fabric pouch and/or an external surface of a heating element is coated with one or more materials to delay the oxidation reaction, in order to provide the user with sufficient time to reseal the heating bag.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION

Figure 1:
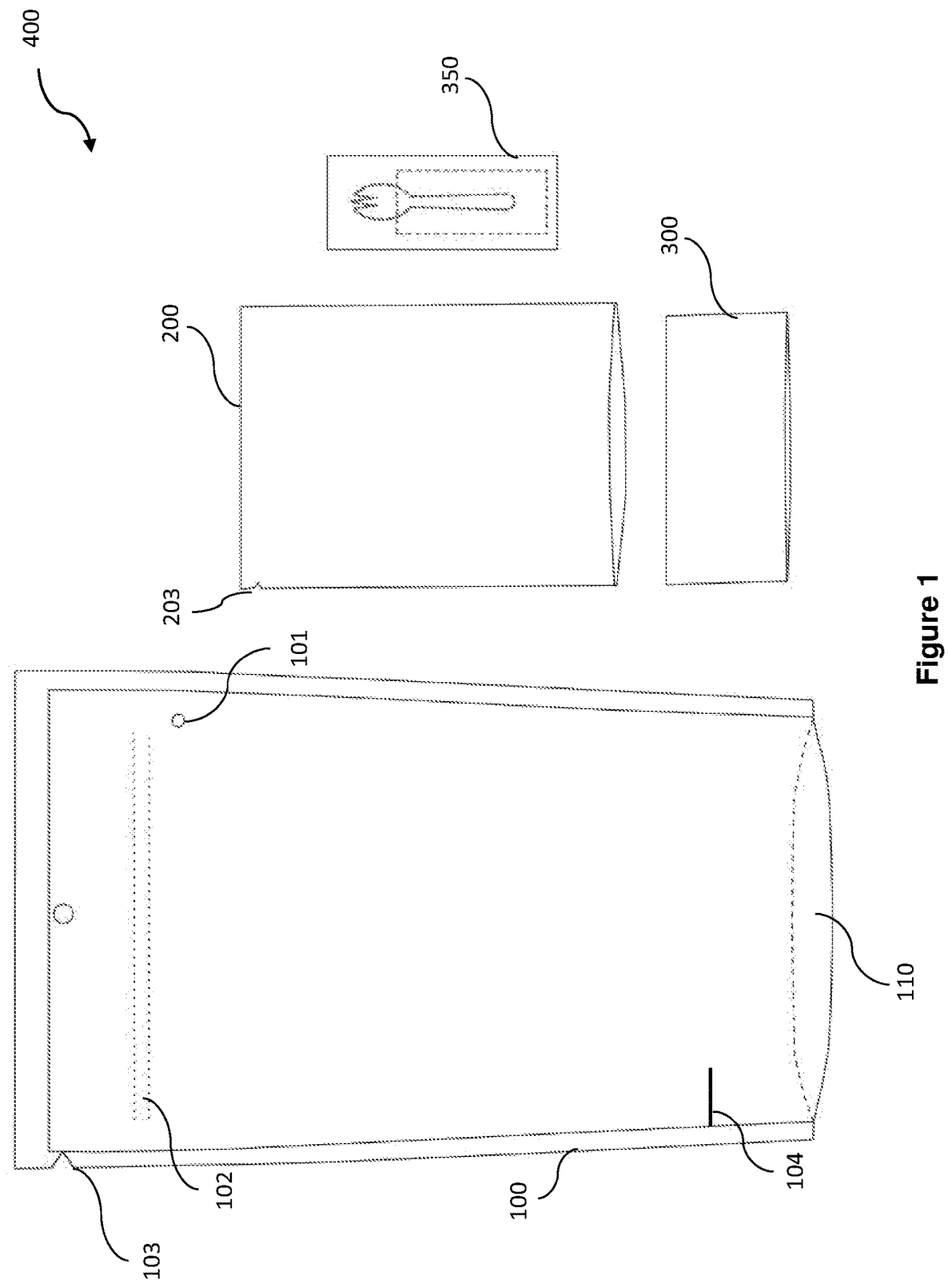
FIG. 1 is a schematic representation of one illustrative embodiment of a self-contained hot meal assembly of the present invention, including a heating bag, a meal pouch, a heating element, and a utensil packet.

As schematically represented in the accompanying drawings, the present invention is generally directed to a self-contained hot meal assembly 400 as generally illustrated at FIG. 1. Accordingly, the self-contained hot meal assembly 400 comprises a heating bag 100, a food pouch 200, a heating element 300, a utensil packet 350, and/or combinations thereof. In one embodiment, each of a food pouch 200, a heating element 300, and a utensil packet 350 are prepackaged in a heating bag 100. In at least one further embodiment, a heating bag 100 serves as an outer package for enclosing the various components of a self-contained hot meal assembly 400 in accordance with the present invention.

In operation, each of a food pouch 200, a heating element 300, and a utensil packet 350 are removed from an outer package which, as noted above, in at least one embodiment comprises a heating bag 100. Turning to the illustrative embodiment of FIG. 2, a heating element 300 is placed in a lower portion of a heating bag 100. As before, the heating bag 100 includes a base 110 structured and dimensioned to allow the heating bag 100 to stand in a substantially upright position and to provide stability when it is in operation. A food pouch 200 including an amount of food to be heated is placed within the heating bag 100, once again, either above the heating element 300, beside the heating element 300, or otherwise proximal to the heating element 300. A predetermined amount of water or any other nonflammable aqueous liquid is added to the heating bag 100, and the heating bag 100 is quickly resealed. In one embodiment, a predetermined amount of water or other nonflammable aqueous liquid is about three fluid ounces. In at least one further embodiment, a water line or visual indicator 104 is printed onto the heating bag 100 along a transparent or partially transparent portion thereof, so that a user can visually determine the predetermined amount of water or other nonflammable aqueous liquid to be added to the heating bag 100.

An aqueous activated exothermic reaction is initiated by exposing the heating element 300 to the predetermined amount of water or other nonflammable aqueous liquid. The reaction heats the water or nonflammable aqueous liquid, which causes steam to rise and circulate around the food pouch 200. The steam is evacuated from the heating bag 100 at a slow and controlled rate safely away from the user via at least one steam vent 101 disposed on a distal and/or upper portion of the heating bag 100.

A heating bag 100 in accordance with one embodiment of the present invention comprises a resealable opening 102, which may include one or more resealable strips for closing the bag to substantially enclose the exothermic steam therein upon operation. In one embodiment, a resealable opening 102 comprises a plastic zipper as known in the art, such as a press-and-seal zipper. In one other embodiment, a resealable opening 102 comprises two or more resealable strips. In at least one embodiment, a heating bag further comprises a tear-away notch 103 disposed on an upper portion above a resealable opening 102, such as is shown by way of example in the illustrative embodiment of FIG. 1. A tear-away notch facilitates convenient opening of the heating bag 100 and access to the resealable opening 102.

Figure 2:
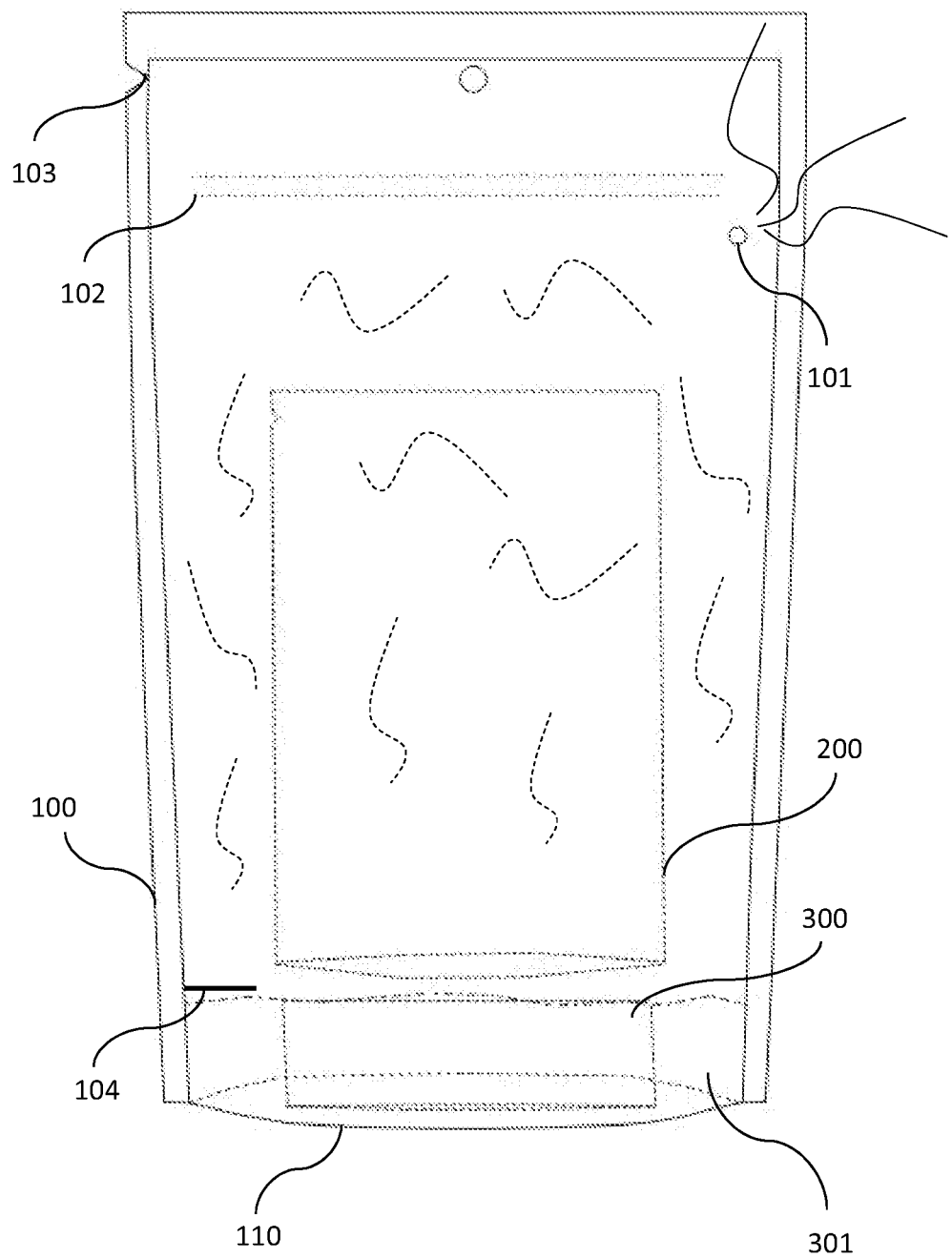
FIG. 2 is a front view of one illustrative embodiment of a self-contained hot meal assembly in accordance with the present invention in operation.
Figure 3:
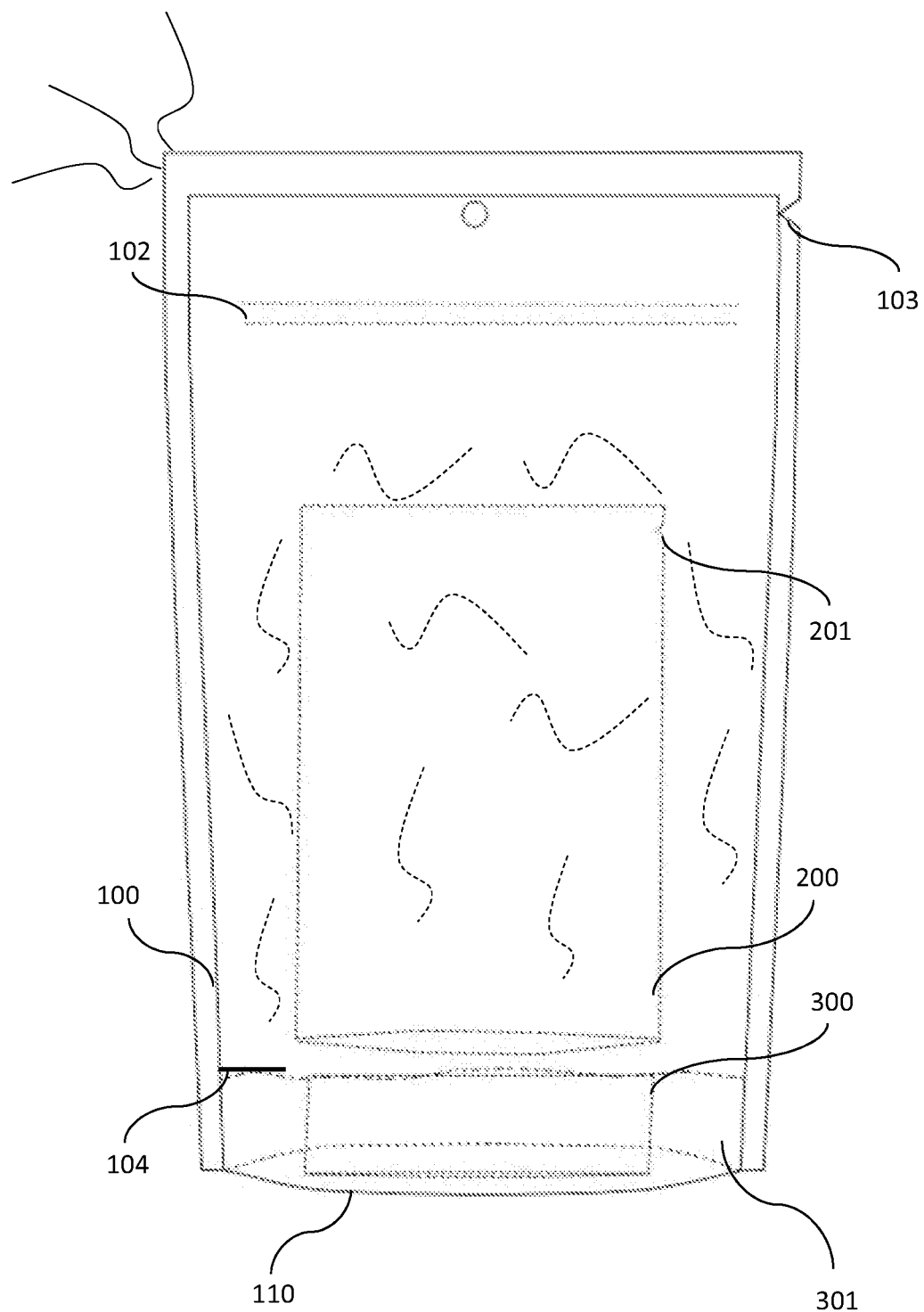
FIG. 3 is a rear view of the illustrative embodiment of a self-contained hot meal assembly of FIG. 2.

At least one steam vent 101 is formed along an upper portion of the heating bag 100 beneath the resealable opening 102. As shown in the illustrative embodiment of FIG. 1, the heating vent 101 is disposed through an upper distal corner of the heating bag 100 in order to facilitate the controlled and safe evacuation of steam from therein. In one embodiment, such as is illustrated in FIGS. 2 and 3, a single steam vent 101 is formed on only one side of the heating bag 100, in this embodiment, through an upper distal corner on the front of the heating bag 100. In another embodiment, such as in the illustrative embodiment of FIG. 4, steam vents 101, 101' are formed through each of the front and back of the heating bag 100'.

A steam vent 101 in accordance with the present invention may comprise a substantially circular aperture formed through a portion of the heating bag 100. Of course, it will be appreciated by those of skill in the art that a steam vent 101 may comprise other geometric configurations which are encompassed within the scope and intent of the present invention. In at least one embodiment, a steam vent 101 is disposed through a distal upper corner of the heating bag 100 and therefore, steam is discharged outwardly from the steam vent at about a 90-degree angle relative to the sides of the heating bag 100, in order to facilitate safe evacuation of the steam away from a user. In other words, the steam vent 101 facilitates the outward projection of steam in a relatively slow and controlled manner, which allows a sufficient temperature to be maintained within the heating bag 100 by circulating steam evenly around the enclosed food pouch 200, while eliminating the danger of over-pressurizing the heating bag 100, causing it to explode or otherwise fail, and potentially harming a user or others proximate the assembly 400, while in use.

In one embodiment, a steam vent comprise a ¼ inch diameter, to allow sufficient heat dissipation from the heating bag 100 during use, so that the structural integrity of the heating bag 100 is not compromised, while maintaining the temperature of the heating process therein to allow for efficient and even heating of an amount of food in a food pouch 200. In one further embodiment, a steam vent 101 comprises a diameter of about ⅛ inch to about ½ inch. As noted above, a steam vent 101 can comprise any of a variety of geometric configurations to facilitate the evacuation of steam from a heating bag 100 at a discharge angle of about 30 degrees to about 90 degrees relative to the sides of the heating bag 100, in order to facilitate safe evacuation of the steam away from a user.

In one embodiment, a visual indicator 104 is marked or otherwise disposed on a heating bag 100, in order to assist a user in adding the predetermined amount of water or other nonflammable aqueous liquid into the heating bag 100 so as to substantially submerge the heating element 300 and initiate an efficient and effective aqueous exothermic reaction. A visual indicator 104 in one embodiment comprises a fill line, and in one further embodiment, a visual indicator 104 comprises an at least partially transparent portion formed on the heating bag 100 itself, such that a user can visualize the amount of water or other nonflammable aqueous liquid being added to the heating bag 100.

In one embodiment, a fluid pouch, not shown, containing a predetermined amount of water or other nonflammable aqueous liquid is incorporated into the present self-contained hot meal assembly 400. A fluid pouch may include a tear-away notch similar to tear-away notch 103 of heating bag 100. In another embodiment, a measuring cup, not shown, to allow a user to measure a predetermined amount of water or other nonflammable aqueous liquid, for example, three fluid ounces, is incorporated into the present self-contained hot meal assembly 400. In yet one further embodiment, the predetermined amount of water or other nonflammable aqueous liquid to be added to the heating bag 100, once again, by way of example, about three fluid ounces, is printed directly on the heating bag 100 itself.

As before, a heating bag 100 may comprise a multilayer film composition designed to be flexible, lightweight, and compliant with Food and Drug Administration requirements. An appropriate sealant may be used in the construction of a heating bag 100 having a melting point greater than 120 degrees Celsius, in order to ensure that the heating bag 100 maintains structural integrity at the relatively elevated temperatures created by the heating element 300. A heating bag 100 in accordance with the present invention may be constructed of a number of suitable materials including but not limited to polyethylene, polyethylene terephthalate (PET or PETE), high density polyethylene (HDPE), low density polyethylene (LDPE), polypropylene (PP), polystyrene (PS), polyvinyl chloride (PVC), polycarbonate, among other appropriate materials or combinations thereof for implementing the present invention.

Figure 4:
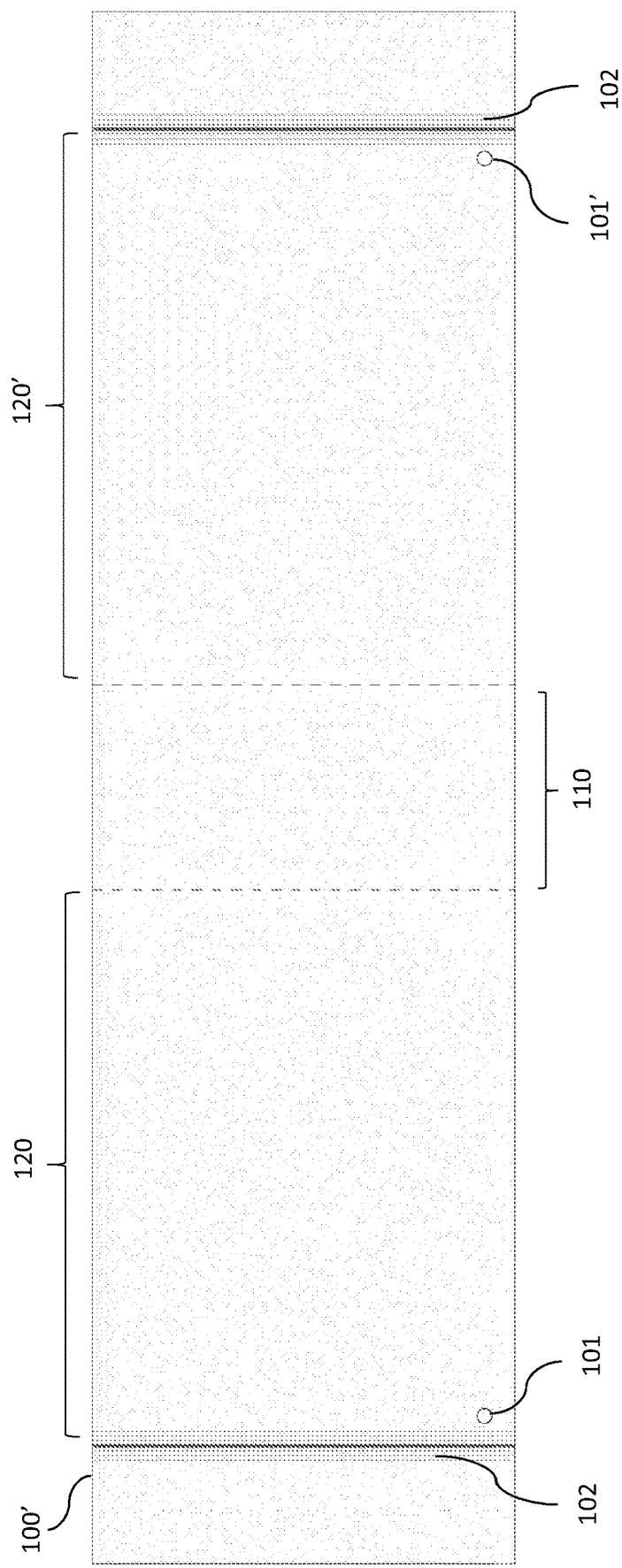
FIG. 4 is a schematic representation of one illustrative embodiment of a heating bag in accordance with the present invention having a one-piece construction.
Figure 5:
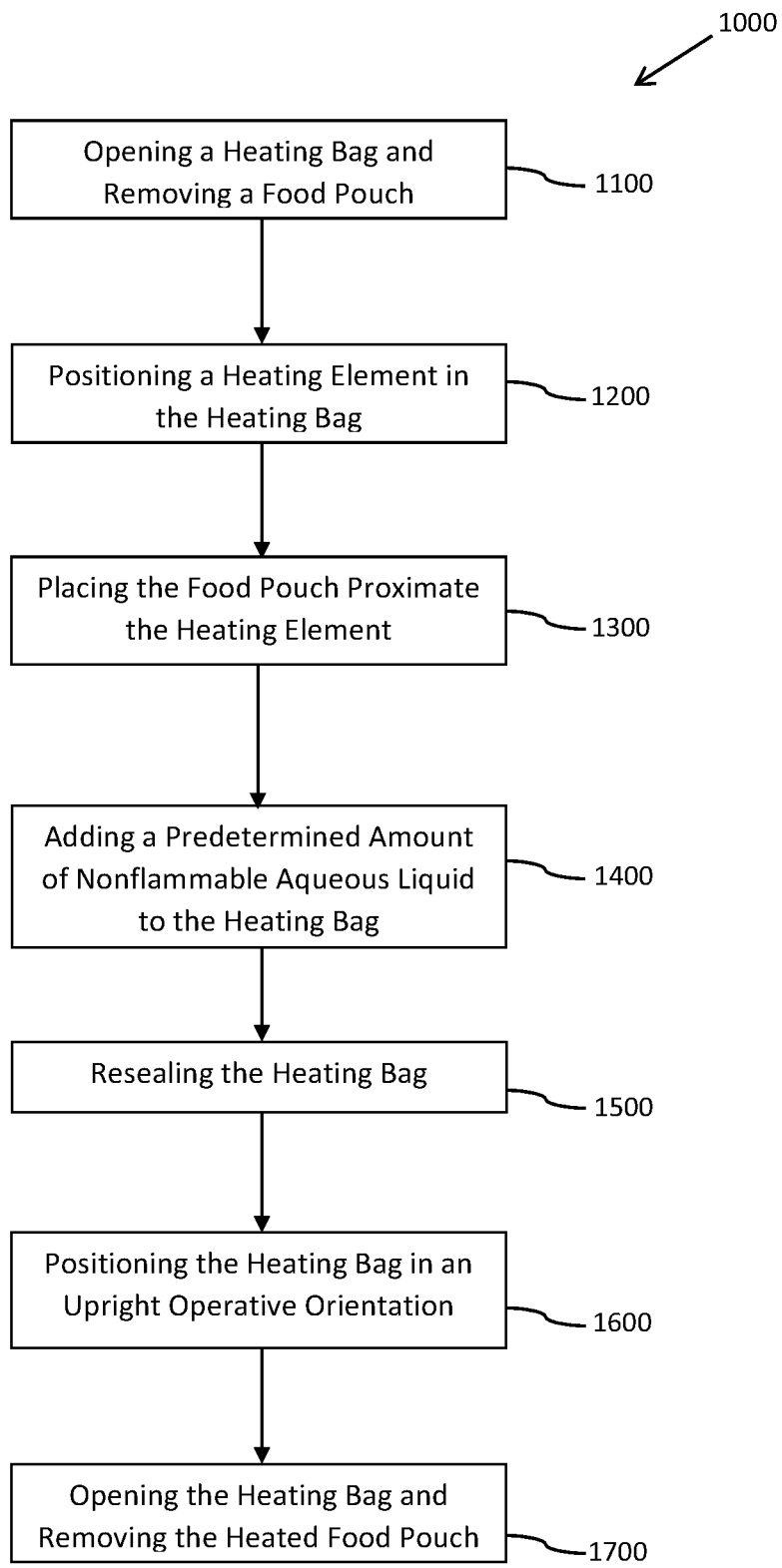
FIG. 5 is a diagrammatic representation of one illustrative embodiment of a method for preparing a hot meal for consumption by a user utilizing a self-contained hot meal assembly in accordance with the present invention.

A heating bag 100 in accordance with at least one embodiment of the present invention comprises a base 110 structured and dimensioned to allow the heating bag 100 to stand in a substantially upright position while in operation. With reference to FIG. 4, one dimensional embodiment of the present invention is shown. Accordingly, in at least one embodiment, a height 120, 120' of a heating bag 100 is about 8 inches to about 10 inches, and a width of the base 110 is about 2 inches to about 5 inches. In at least one embodiment, a base 100 comprises a material of construction having sufficient elasticity such that the base 110 is expandable and collapsible. Providing an expandable base 100 allows a volume of a self-contained hot meal assembly 400 to be reduced for transit by user, such as, in a backpack. Different types of food products may require a heating bag 100 having different dimensions in order for the heating process to occur efficiently. However, because it is desirable for steam to travel upwards and along one or more external surfaces of a food pouch 200, the height 120, 120' of a heating bag 100 will be about 1.1 to about 3 times the width 110 a base 110.

A food pouch 200 may also comprise a single or multi-layer foil pouch with an amount of food sealed therein. In one embodiment, a food pouch 200 comprises a 4-ply layer foil pouch that has undergone a retort process at high temperatures and high pressure for complete sterilization, in order to extend the shelf life of the food therein. In another embodiment, a food pouch comprises between 2 to 8 layers.

A heating element 300 in accordance with the present invention includes a reactive composition which is reactive upon contact with water or any other nonflammable aqueous liquid for facilitating the generation of heat in an exothermic electron-transfer or oxidation-reduction reaction. In one embodiment, water or another nonflammable aqueous liquid is poured into the heating bag 100 and onto the heating element 300 which comprises a predetermined amount of a mixture of sodium hydroxide and aluminum. The aqueous exothermic reaction with water or another nonflammable aqueous liquid is as follows:

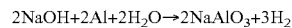

$$2NaOH+2Al+2H_2O \rightarrow 2NaAlO_3+3H_2$$

In order to accelerate this reaction, mixed metallic iron particles and/or other particles may be added to the heating element 300. In one embodiment of the present invention, a proprietary reactive composition comprises a mixture of aluminum powder, calcium oxide, calcium carbonate, calcium di-hydroxide, sodium carbonate, and/or sodium hydroxide is utilized in a heating element 300. In at least one further embodiment of the present invention, a proprietary reactive composition comprises a mixture of aluminum powder and sodium hydroxide is utilized in the heating element 300. The predetermined amount of aluminum powder and sodium hydroxide is disposed within a fabric pouch or container. In at least one embodiment, the pouch or container is a non-woven fabric, and in one further embodiment, the pouch or container is biodegradable. A heating element 300 in accordance with at least one embodiment of the present invention generates sufficient heat to maintain a temperature within a heating bag 100, and thus, surrounding a food pouch 200, at about 105 degrees Celsius for about 3 to about 5 minutes. The proprietary mixture within a heating element 300 in accordance with the present invention may be required to pass the Substances of Very High Concern (SVHC) screening test. In at least one embodiment, a heating element 300 is dimensioned cooperatively with a base 110 of a heating bag 100, in order to facilitate its expansion thereof and to provide stability of the heating bag 100 in a substantially upright position while in use, such as is shown in FIGS. 2 and 3.

A utensils packet 350 in at least one embodiment includes utensils such as plastic or other disposable forks, sporks, knives, napkins, condiments, etc. A utensils packet 350 is removed from the heating bag 100 prior to adding water or another nonflammable aqueous liquid.

The present invention is further directed to a method for preparing a hot meal 1000 for consumption by a user utilizing a self-contained hot meal assembly. In at least one embodiment, the present method for preparing a hot meal 1000 comprises opening a resealable opening of a heating bag and removing a food pouch therefrom 1100. In one further embodiment, the present method 1000 also comprises removing a utensils packet form the heating bag as well. The present method for preparing a hot meal 1000 further comprises positioning a heating element 1200, for example, positioning a heating element 1200 in a lower portion of the heating bag. In accordance with one embodiment, the present method for preparing a hot meal 1000 further comprises placing a food pouch 1300 containing an amount of a food product at least temporarily sealed therein proximate the heating element in the heating bag.

The present method for preparing a hot meal 1000 further comprises adding a predetermined amount of a nonflammable aqueous liquid 1400 to the heating bag thereby initiating an exothermic reaction with a reactive composition in the heating element. In at least one embodiment, the present method for preparing a hot meal 1000 includes resealing the resealable opening 1500 of the heating bag. In yet one further embodiment, the present method for preparing a hot meal 1000 further comprises positioning the heating bag 1600, for example, positioning the heating bag 1600 in a substantially upright operative orientation and allowing steam generated by the exothermic reaction to heat an amount of food product in the food pouch.

The present method for preparing a hot meal 1000 further comprises opening the resealable opening of the heating bag and removing a food pouch therefrom 1700, wherein the food pouch now contains a fully heated food product which is ready to eat.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A self-contained hot meal assembly including:
   a heating bag comprising a multi-layer construction utilizing a sealant having a melting point of greater than 120 degrees Celsius,
   a resealable opening disposed on one end of said heating bag,
   a base disposed on another end of said heating bag opposite said releasable opening,
   a heating pouch, comprising a predetermined amount of a reactive composition contained therein,
   a food pouch comprising an amount of a food product at least temporarily sealed therein,
   a utensil pouch,
   a fluid pouch containing a predetermined amount of a nonflammable aqueous liquid,
   said reactive composition within said heating pouch reactive with said nonflammable aqueous liquid to initiate an exothermic reaction, said exothermic reaction sufficient to generate steam within said heating bag, upon interaction with said nonflammable aqueous liquid,
   said heating pouch, said food pouch, said utensil pouch and said fluid pouch initially prepackaged within said heating bag to facilitate storage and transport thereof prior to use,
   said heating bag dimensioned and configured to allow said heating pouch and said food pouch to be operatively positioned therein for heating of said food product by said generated steam,
   said predetermined amount of said reactive composition in said heating pouch is reactive with said predetermined amount of said nonflammable aqueous liquid to generate enough heat to maintain a threshold temperature of about 105 degrees Celsius within said heating bag for about 3 minutes to about 5 minutes, thereby heating said amount of food product in said food pouch for consumption by a user, and
   at least one steam vent structured to discharge steam from said heating bag at a controlled rate that allows the threshold temperature to be maintained within said heating bag by circulating steam evenly around said food pouch to provide a fully heated food product within said food pouch.

2. The assembly of claim 1 wherein said base is dimensioned and configured to maintain said heating bag in a substantially upright operative orientation while in use.

3. The assembly as recited in claim 1 wherein said at least one steam vent is disposed and configured to discharge steam at an angle of approximately ninety degrees relative to a side of said heating bag.

4. A self-contained hot meal assembly including:
   a heating bag,
   a resealable opening disposed on one end of said heating bag,
   a base disposed on another end of said heating bag opposite said releasable opening, said base dimensioned and configured to maintain said heating bag in a substantially upright operative orientation while in use,
   at least one steam vent formed through an upper portion of said heating bag below said resealable opening, said at least one steam vent comprising aperture,
   a heating pouch containing a predetermined amount of a reactive composition,
   a fluid pouch containing a predetermined amount of a nonflammable aqueous liquid,
   said reactive composition reactive with said nonflammable aqueous liquid to initiate an exothermic reaction, said exothermic reaction sufficient to generate steam within said heating bag, upon interaction with said nonflammable aqueous liquid,
   a food pouch disposed within said heating bag and comprising an amount of a food product at least temporarily sealed therein,
   a utensil pouch,
   said heating bag dimensioned and configured to allow said heating and said food pouch to be operatively positioned therein for heating of the food product by said generated steam,
   said predetermined amount of said reactive composition in said heating pouch is reactive with said predetermined amount of said nonflammable aqueous liquid to generate enough heat to maintain a threshold temperature of about 105 degrees Celsius within said heating bag for about 3 minutes to about 5 minutes, thereby heating said amount of food product in said food pouch for consumption by a user,
   said at least one steam vent structured to discharge steam from said heating bag at a controlled rate that allows the threshold temperature to be maintained within said heating bag by circulating steam evenly around said food pouch to provide a fully heated food product within said food pouch, and
   said food pouch, said utensil pouch and said fluid pouch initially prepackaged within said heating bag to facilitate storage and transport thereof prior to use.

5. The assembly as recited in claim 4 wherein said at least one steam vent is formed through said heating bag and disposed and structured to discharge steam at an angle of approximately ninety degrees relative to a side of said heating bag.

6. The assembly as recited in claim 4 comprising a plurality of steam vents formed through said upper portion of said heating bag.

7. The assembly as recited in claim 6 wherein each of said plurality of steam vents is formed through said heating bag and disposed and structured to discharge steam at an angle of approximately ninety degrees relative to a side of said heating bag.

8. The assembly as recited in claim 4 wherein said base comprises an expandable construction.

9. A method for preparing a hot meal for consumption by a user utilizing a self-contained hot meal assembly, the method comprising:
- prepackaging a heating pouch, a food pouch, a fluid pouch and a utensil pouch within a heating bag,
- opening a resealable opening of the heating bag and removing at least the food pouch, fluid pouch and the utensil pouch therefrom,
- including a reactive composition in the heating pouch and positioning the heating pouch in a lower portion of the heating bag,
- placing the food pouch containing an amount of a food product at least temporarily sealed therein proximate the heating pouch in the heating bag,
- adding a predetermined amount of a nonflammable aqueous liquid from the fluid pouch to the reactive composition in the heating bag to initiate an exothermic reaction sufficient to generate enough heat to maintain a temperature of about 105 degrees Celsius within the resealed heating bag for about 3 minutes to about 5 minutes while continually generating steam, thereby heating the amount of food product in the food pouch for consumption by the user,
- resealing the resealable opening of the heating bag,
- positioning the heating bag in a substantially upright operative orientation and heating the amount of food product in the food pouch by the generated steam, and
- discharging an amount of steam via at least one steam vent at a controlled rate that allows the temperature to be maintained at about 105 degrees Celsius within said heating bag and circulating the steam evenly around said food pouch to provide a fully heated food product within said food pouch.

10. The method as recited in claim 9 wherein adding the predetermined amount of the nonflammable aqueous liquid to the reactive composition further comprises adding about three fluid ounces of the nonflammable aqueous liquid to the reactive composition.

11. The method as recited in claim 9 wherein positioning the heating bag in the substantially upright operative orientation further comprises positioning at least one steam vent formed through the heating bag so as to discharge steam from a side of the heating bag in a direction away from the user.

* * * * *